United States Patent
Kadokura

(10) Patent No.: US 10,775,766 B2
(45) Date of Patent: Sep. 15, 2020

(54) COMPENSATION QUANTITY ACQUISITION DEVICE, FEED MECHANISM CONTROL DEVICE, COMPENSATION QUANTITY ACQUIRING METHOD AND FEED MECHANISM CONTROL METHOD

(71) Applicant: FANUC CORPORATION, Yamanashi (JP)

(72) Inventor: Hiromitsu Kadokura, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/296,968

(22) Filed: Mar. 8, 2019

(65) Prior Publication Data
US 2019/0283197 A1 Sep. 19, 2019

(30) Foreign Application Priority Data
Mar. 14, 2018 (JP) .................................. 2018-046196

(51) Int. Cl.
*G05B 19/402* (2006.01)
*G05B 19/404* (2006.01)

(52) U.S. Cl.
CPC ......... *G05B 19/402* (2013.01); *G05B 19/404* (2013.01); *G05B 2219/34048* (2013.01); (Continued)

(58) Field of Classification Search
CPC .... B23Q 17/2291; B23Q 17/12; B23Q 15/12; B23Q 1/25; B23Q 1/017; G05B 19/402; (Continued)

(56) References Cited

U.S. PATENT DOCUMENTS 5,021,941 A 6/1991 Ford et al.
6,275,781 B1 * 8/2001 Maness ............... G01M 13/045
702/182
(Continued)

FOREIGN PATENT DOCUMENTS

JP 02-230303 9/1990
JP 04-322302 A 11/1992
(Continued)

OTHER PUBLICATIONS

Search Report issued by the Japanese Patent Office in relation to Japanese Application No. 2018-046196 dated Feb. 19, 2020 (12 pages) along with English language translation (17 pages).
(Continued)

*Primary Examiner* — Christopher E. Everett
(74) *Attorney, Agent, or Firm* — Robert P. Michal, Esq.; Carter, DeLuca & Farrell LLP

(57) ABSTRACT

A compensation quantity acquisition device acquires vibration of the movement target in a second axis direction, orthogonal to the first axis direction when the movement target is moved in the first axis direction, acquires a positional frequency characteristic by performing Fourier transformation on the acquired vibration in the second axis direction, performs inverse Fourier transformation on the positional frequency characteristic from which the component of position independent frequency in the second axis direction (that occurs independently of a position of the movement target in the first axis direction) has been removed, to recover the vibration of the movement target in the second axial direction as position dependent vibration, and acquires positional compensation quantity of the movement target in the second axis direction that cancels the position dependent vibration.

8 Claims, 6 Drawing Sheets

(52) U.S. Cl.
CPC .............. *G05B 2219/35517* (2013.01); *G05B 2219/45221* (2013.01); *G05B 2219/49088* (2013.01); *G05B 2219/49176* (2013.01)

(58) Field of Classification Search
CPC ........ G05B 19/404; G05B 2219/35517; G05B 2219/49176; G05B 2219/49088; G05B 2219/45221; G05B 2219/34048; G06F 17/14; B23H 11/003; B23H 7/02
See application file for complete search history.

(56) References Cited

U.S. PATENT DOCUMENTS

| | | |
|---|---|---|
| 2009/0019979 A1 | 1/2009 | Kimura et al. |
| 2016/0266567 A1 | 9/2016 | Watanabe et al. |

FOREIGN PATENT DOCUMENTS

| | | |
|---|---|---|
| JP | H0683417 A | 3/1994 |
| JP | H07261853 A | 10/1995 |
| JP | 10-283033 A | 10/1998 |
| JP | 2001293638 A | 10/2001 |
| JP | 2005103739 A | 4/2005 |

OTHER PUBLICATIONS

Decision to Grant a Patent issued by the Japanese Patent Office in relation to Japanese Application No. 2018-046196 dated Feb. 25, 2020 (3 pages) along with English language translation (2 pages).

\* cited by examiner

COMPENSATION QUANTITY ACQUISITION DEVICE, FEED MECHANISM CONTROL DEVICE, COMPENSATION QUANTITY ACQUIRING METHOD AND FEED MECHANISM CONTROL METHOD

CROSS-REFERENCE TO RELATED APPLICATION

This application is based upon and claims the benefit of priority from Japanese Patent Application No. 2018-046196 filed on Mar. 14, 2018, the contents of which are incorporated herein by reference.

BACKGROUND OF THE INVENTION

Field of the Invention

The present invention relates to a compensation quantity acquisition device and a compensation quantity acquiring method that acquire compensation quantity for cancelling the vibration of a movement target in a second axis direction, orthogonal to a first axis direction when the movement target is moved in the first axis direction, as well as relating to a feed mechanism control device and a feed mechanism control method for driving a second driver based on the acquired compensation quantity.

Description of the Related Art

Japanese Laid-Open Patent Publication No. 10-283033 discloses a shaft feed mechanism for moving a workpiece in the X-axis direction and the Y-axis direction in a processing machine, in which variations in the position of the X-axis carriage in the Y-axis direction caused when the X-axis carriage is moved in the X-axis direction along the X-axis linear guide is determined. In this mechanism, a controller for controlling the movement in the Y-axis direction of the Y-axis carriage which is moved along the Y-axis linear guide is provided so as to cancel the aforementioned positional variations in the Y-axis direction.

SUMMARY OF THE INVENTION

The vibration in the second axis direction orthogonal to the first axis direction of the movement target when the movement target is moved in the first axial direction includes vibrations depending on the position of the movement target in the first axial direction and vibrations independent of the position in the first axis direction. Even if the movement target is moved so as to cancel the vibrations in the second axis direction of the movement target by applying the technique described in Japanese Laid-Open Patent Publication No. 10-283033, the vibrations of the movement target not depending on the position in the first axis direction cannot be alleviated but there is a risk of amplifying the vibration instead.

The present invention has been devised to solve the above problem, it is therefore an object of the present invention to provide a compensation quantity acquisition device and a compensation quantity acquiring method that acquire compensation quantity for suppressing the vibration of a movement target in a second axis direction when the movement target is moved in a first axis direction, as well as providing a feed mechanism control device and a feed mechanism control method for suppressing the vibration of the movement target in a second axis direction.

A compensation quantity acquisition device according to a first aspect of the present invention is used when a movement target is moved in a first axis direction, and includes: a vibration acquisitor configured to acquire vibration of the movement target in a second axis direction, orthogonal to the first axis direction when the movement target is moved in the first axis direction; a positional frequency characteristic acquisitor configured to acquire a positional frequency characteristic by performing Fourier transformation on the vibration in the second axis direction acquired by the vibration acquisitor; a position independent frequency storage configured to store a positional frequency of the vibration in the second axis direction that occurs independently of a position of the movement target in the first axis direction, as a position independent frequency; a position dependent vibration acquisitor configured to perform inverse Fourier transformation on the positional frequency characteristic from which a component of the position independent frequency has been removed, to recover the vibration of the movement target in the second axial direction as position dependent vibration; and a compensation quantity acquisitor configured to acquire positional compensation quantity of the movement target in the second axis direction that cancels the position dependent vibration.

A feed mechanism control device according to a second aspect of the present invention includes: a first driver configured to move a movement target in a first axis direction; a second driver configured to move the movement target in a second axis direction orthogonal to the first axis direction; and a second drive controller configured to drive the second driver based on the compensation quantity acquired by the above-described compensation quantity acquisition device when the movement target is being moved in the first axis direction by the first driver.

A compensation quantity acquiring method according to a third aspect of the present invention is used when a movement target is moved in a first axis direction, and includes: a vibration acquiring step of acquiring vibration of the movement target in a second axis direction, orthogonal to the first axis direction when the movement target is moved in the first axis direction; a positional frequency characteristic acquiring step of acquiring a positional frequency characteristic by performing Fourier transformation on the vibration in the second axis direction acquired by the vibration acquiring step; a position independent frequency storing step of storing a positional frequency of the vibration in the second axis direction that occurs independently of a position of the movement target in the first axis direction, as a position independent frequency; a position dependent vibration acquiring step of performing inverse Fourier transformation on the positional frequency characteristic from which a component of the position independent frequency has been removed, to recover the vibration of the movement target in the second axial direction as position dependent vibration; and a compensation quantity acquiring step of acquiring positional compensation quantity of the movement target in the second axis direction that cancels the position dependent vibration.

A control method for a feed mechanism according to a fourth aspect of the present invention includes a first driver for moving a movement target in a first axis direction and a second driver for moving the movement target in a second axis direction orthogonal to the first axis direction, the method comprising a second drive controlling step of driving the second driver based on the compensation quantity acquired by the above-described compensation quantity acquiring method when the movement target is being moved in the first axis direction by the first driver.

The compensation quantity acquisition device and the compensation quantity acquiring method of the present invention can acquire compensation quantity that suppresses vibration of the movement target in the second axis direction arising when the movement target is moved in the first axial direction. Further, the feed mechanism control device and the feed mechanism control method of the present invention can suppress vibration of the movement target in the second axis direction.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Worktable Feed Mechanism]

Figure 1:
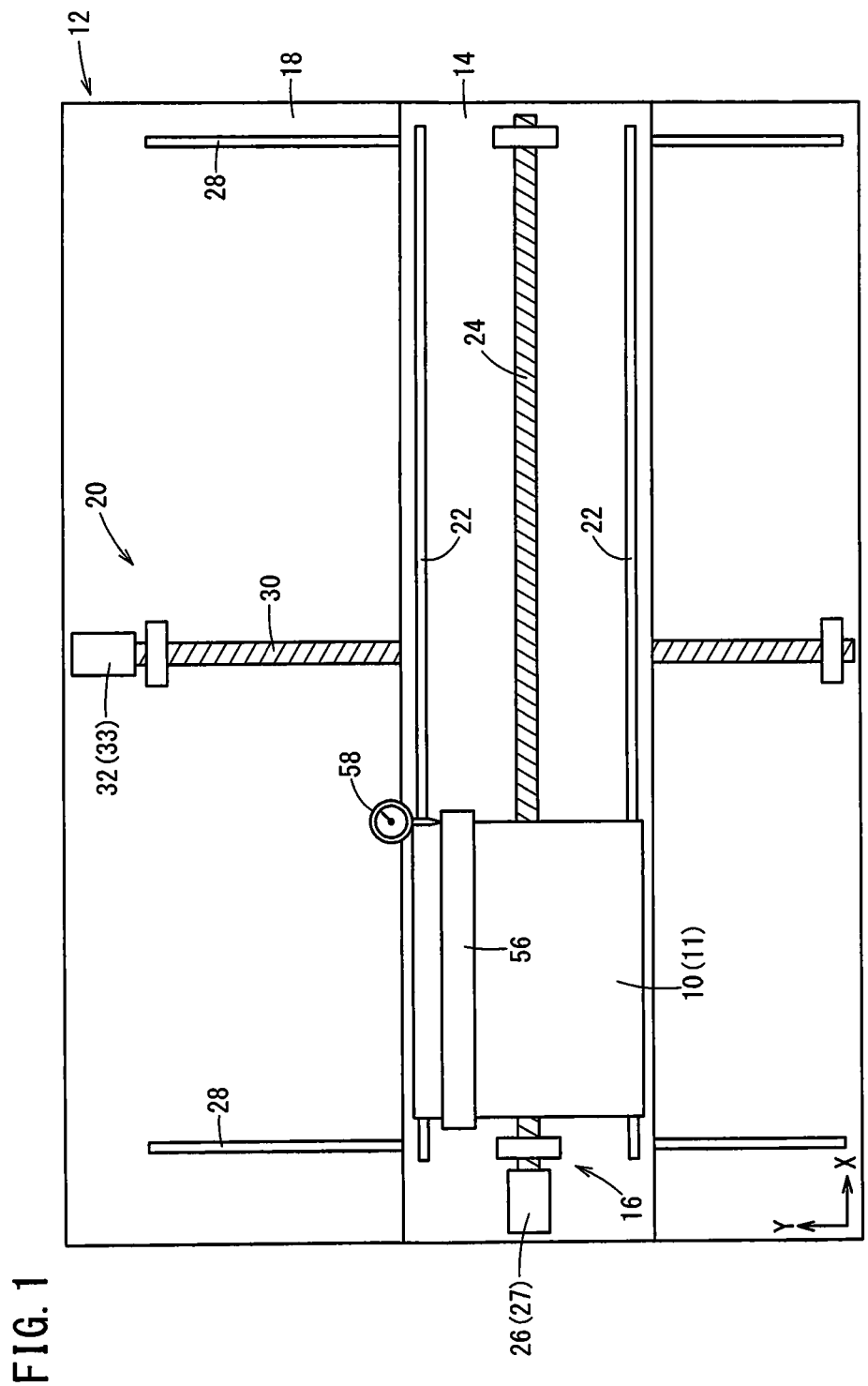
FIG. 1 is a schematic diagram showing a worktable feed mechanism.

A feed mechanism 12 of a worktable 10 of the present embodiment is used in a wire electrical discharge machine. The worktable 10 constitutes a movement target 11. FIG. 1 is a schematic diagram showing the feed mechanism 12 of the worktable 10. FIG. 1 schematically shows the configuration of the worktable 10 and the feed mechanism 12 with no work-pan or the like illustrated. The worktable 10 is moved by the feed mechanism 12 in the X-axis direction and the Y-axis direction that is orthogonal to the X-axis direction. The feed mechanism 12 includes an X-axis feed mechanism 16 installed in a saddle 14 and a Y-axis feed mechanism 20 installed in a bed 18.

The X-axis feed mechanism 16 includes linear guide rails 22, an unillustrated linear guide, a ball screw shaft 24, an unillustrated ball screw nut and an X-axis motor 26. The linear guide rails 22 are fixed by screws to the saddle 14 and extend in the X-axis direction. The linear guide is provided on the worktable 10 so as to move along the linear guide rails 22, thereby guiding the worktable 10 in the X-axis direction. The ball screw shaft 24 is rotatable about the longitudinal axis and arranged on the saddle 14 so as to extend in the X-axis direction. The ball screw nut is fixed to the worktable 10 in a non-rotatable manner. The X-axis motor 26 rotates the ball screw shaft 24. As the ball screw shaft 24 rotates, the ball screw nut moves in the X-axis direction together with the worktable 10. The X-axis motor 26 constitutes a first driver 27 or a second driver 33.

The Y-axis feed mechanism 20 includes linear guide rails 28, an unillustrated linear guide, a ball screw shaft 30, an unillustrated ball screw nut and a Y-axis motor 32. The linear guide rails 28 are fixed by screws to the bed 18 and extend in the Y-axis direction. The linear guide is provided on the worktable 10 so as to move along the linear guide rails 28, thereby guiding the worktable 10 in the Y-axis direction. The ball screw shaft 30 is rotatable about the longitudinal axis and arranged on the bed 18 so as to extend in the Y-axis direction. The ball screw nut is fixed to the worktable 10 in a non-rotatable manner. The Y-axis motor 32 rotates the ball screw shaft 30. As the ball screw shaft 30 rotates, the ball screw nut moves in the Y-axis direction together with the worktable 10. The Y-axis motor 32 constitutes the second driver 33 or the first driver 27.

[Configuration of Worktable Feed Mechanism Control Device]

Figure 2:
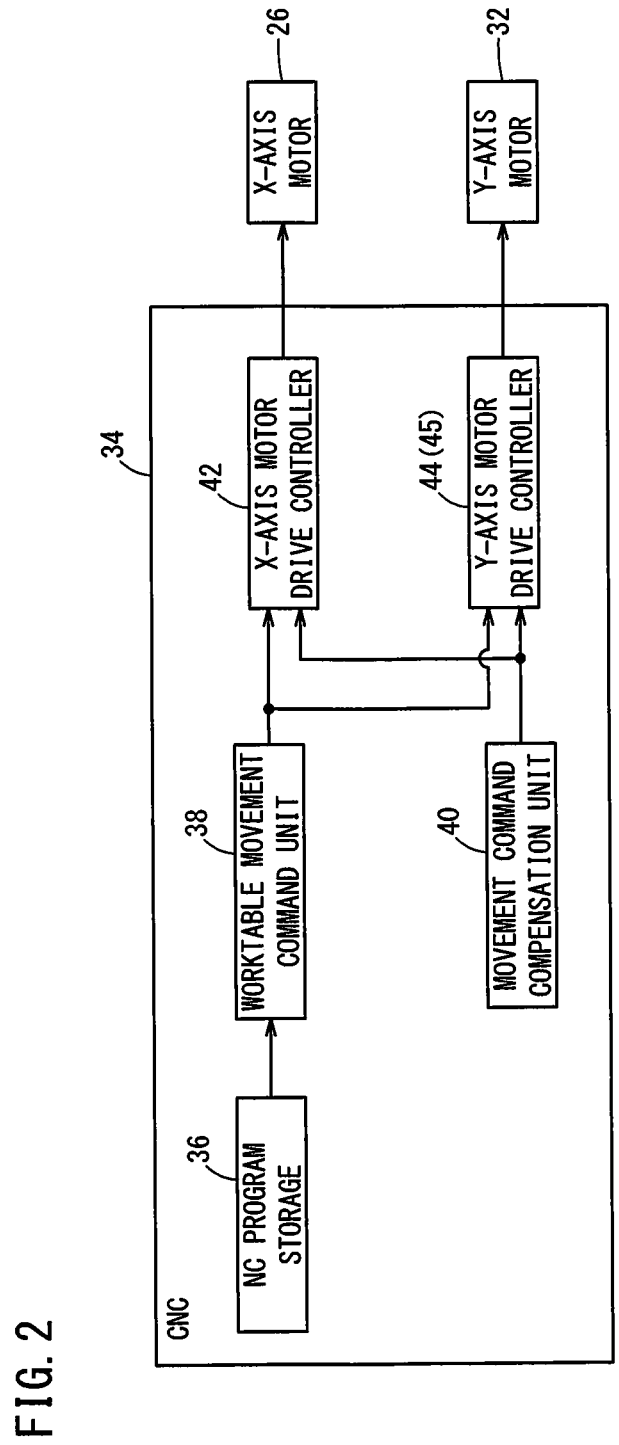
FIG. 2 is a block diagram showing a worktable feed mechanism control device.

FIG. 2 is a block diagram showing a feed mechanism control device 34 for the worktable 10. The feed mechanism control device 34 is a CNC that controls a wire electrical discharge machine. The feed mechanism control device 34 includes an NC program storage 36, a worktable movement command unit 38, a movement command compensation unit 40, an X-axis motor drive controller 42 and a Y-axis motor drive controller 44.

The NC program storage 36 stores an NC program prepared in advance by CAM or the like. The worktable movement command unit 38 outputs a movement quantity and the movement speed of the worktable 10 in the X-axis direction as the X-axis movement command values in accordance with the movement path and movement speed of the unillustrated wire electrode specified by the NC program, and outputs a movement quantity and the movement speed in the Y-axis direction as the Y-axis movement command values. The movement command compensation unit 40 outputs the compensation quantity of the X-axis movement command value as the X-axis compensation quantity and the compensation quantity of the Y-axis movement command value as the Y-axis compensation quantity. The X-axis compensation quantity and the Y-axis compensation quantity will be described later in detail.

The X-axis motor drive controller 42, based on the X-axis movement command values and the X-axis compensation quantity, controls electric power to be supplied to the X-axis motor 26. The Y-axis motor drive controller 44, based on the Y-axis movement command values and the Y-axis compensation quantity, controls electric power to be supplied to the Y-axis motor 32. The Y-axis motor drive controller 44 constitutes a second drive controller 45.

[Configuration of Compensation Quantity Acquisition Device]

The worktable 10 vibrates in the Y-axis direction due to shaft run-out of the ball screw shaft 24 or due to distortion of linear guide rails 22 when the worktable 10 is moved in the X-axis direction. Similarly, when the worktable 10 is moved in the Y-axis direction, vibration in the X-axis direction occurs in the worktable 10. The feed mechanism control device 34 for the worktable 10 of the present embodiment controls the X-axis motor 26 and the Y-axis motor 32 so as to cancel the vibrations in the X-axis direction and the Y-axis direction of the worktable 10.

Figure 3:
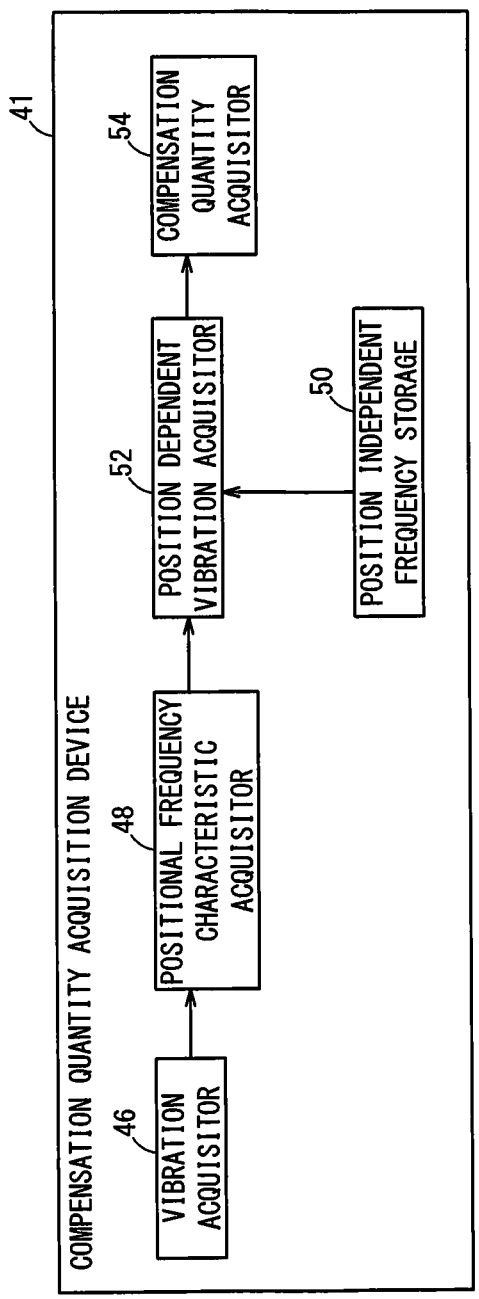
FIG. 3 is a block diagram showing a configuration of a compensation quantity acquisition device.

FIG. 3 is a block diagram showing a configuration of a compensation quantity acquisition device 41. The compensation quantity acquisition device 41 is, for example, a personal computer or the like and includes a vibration acquisitor 46, a positional frequency characteristic acquisitor 48, a position independent frequency storage 50, a position dependent vibration acquisitor 52 and a compensation quantity acquisitor 54.

Figure 4:
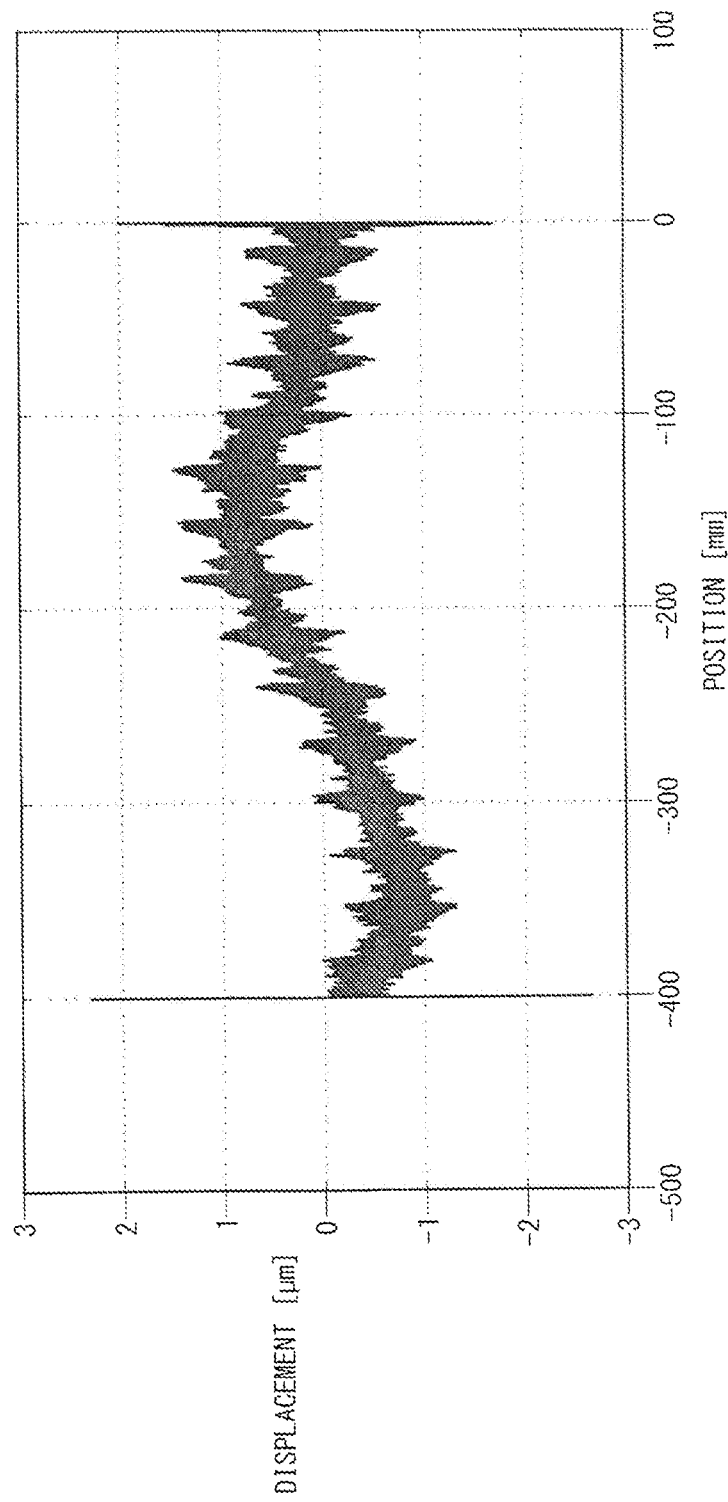
FIG. 4 is a graph showing vibrations of a worktable in the Y-axis direction.

The vibration acquisitor 46 acquires vibration of the worktable 10 in the Y-axis direction when the worktable 10 is moved in the X-axis direction. FIG. 4 is a graph showing the vibration of the worktable 10 in the Y-axis direction. In FIG. 4, the horizontal axis shows the position of the worktable 10 in the X-axis direction, and the vertical axis shows the displacement of vibration.

Vibration of the worktable 10 in the Y-axis direction is acquired as follows. As shown in FIG. 1, the operator fixes a straight edge 56 to the worktable 10 so as to be parallel to the X-axis. Further, the operator fixes a dial gauge 58 to an unillustrated spindle or the like and brings the probe into contact with one end of the straight edge 56. The operator moves the worktable 10 in the X-axis direction and the vibration acquisitor 46 acquires vibration with respect to the reference position in the Y-axis direction from the measurements taken by the dial gauge 58.

Figure 5:
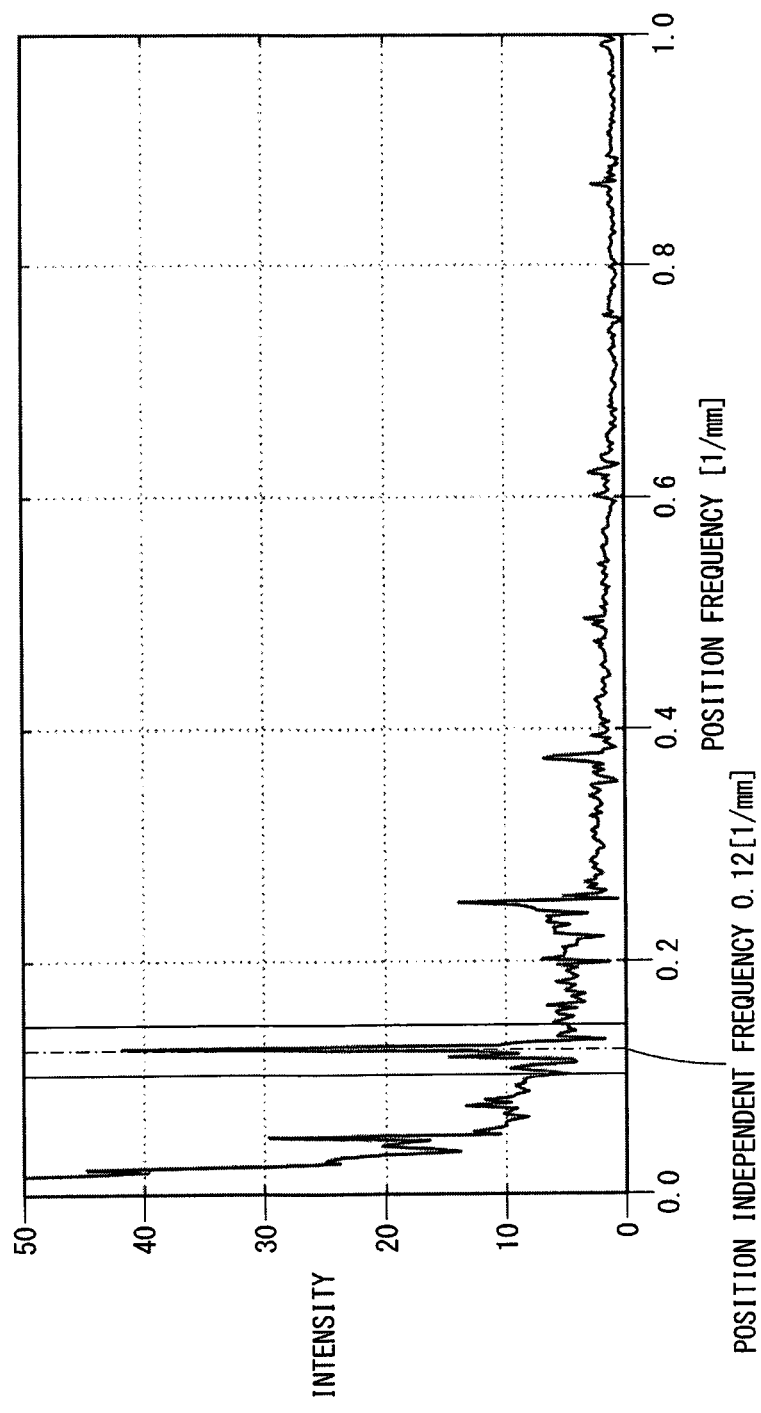
FIG. 5 is a graph showing positional frequency characteristics of vibration of a worktable in the Y-axis direction.

The positional frequency characteristic acquisitor 48 performs Fourier transformation on the vibration of the worktable 10 in the Y-axis direction acquired by the vibration acquisitor 46 to determine the positional frequency characteristics. FIG. 5 is a graph showing the positional frequency characteristics of the vibration shown in FIG. 4. In FIG. 5, the horizontal axis represents the positional frequency and the vertical axis represents vibration intensity.

The position independent frequency storage 50 stores the position frequencies of the vibration of the worktable 10 in the Y-axis direction generated independently of the position of the worktable 10 in the X-axis direction as position independent frequencies. In the present embodiment, for example, 0.12 [1/mm] is a position independent frequency. The causes of the vibration of the worktable 10 in the Y-axis direction are limited not only to the shaft run-out of the ball screw shaft 24 and the distortion of the linear guide rails 22 but also the in-and-out movement of the balls in the linear guide and the ball screw nut and others. Vibrations of the worktable 10 in the Y-axis direction due to shaft run-out of the ball screw shaft 24 and due to distortion of the linear guide rail 22 occur when the worktable 10 is positioned at fixed positions in the X-axis direction. On the other hand, vibrations of the worktable 10 in the Y-axis direction due to moving in and out of the balls in the linear guide or the ball screw nut does not occur when the worktable 10 is located at fixed positions in the X-axis direction. This is because the balls frequently move in and out in the linear guide or the ball screw nut.

Since the vibration of the worktable 10 in the Y-axis direction due to the in-and-out movement of the balls in the linear guide or the ball screw nut occurs at intervals of a substantially fixed distance (at regular intervals) when the worktable 10 moves in the X-axis direction, the positional frequency of the vibration can be obtained in advance.

Figure 6:
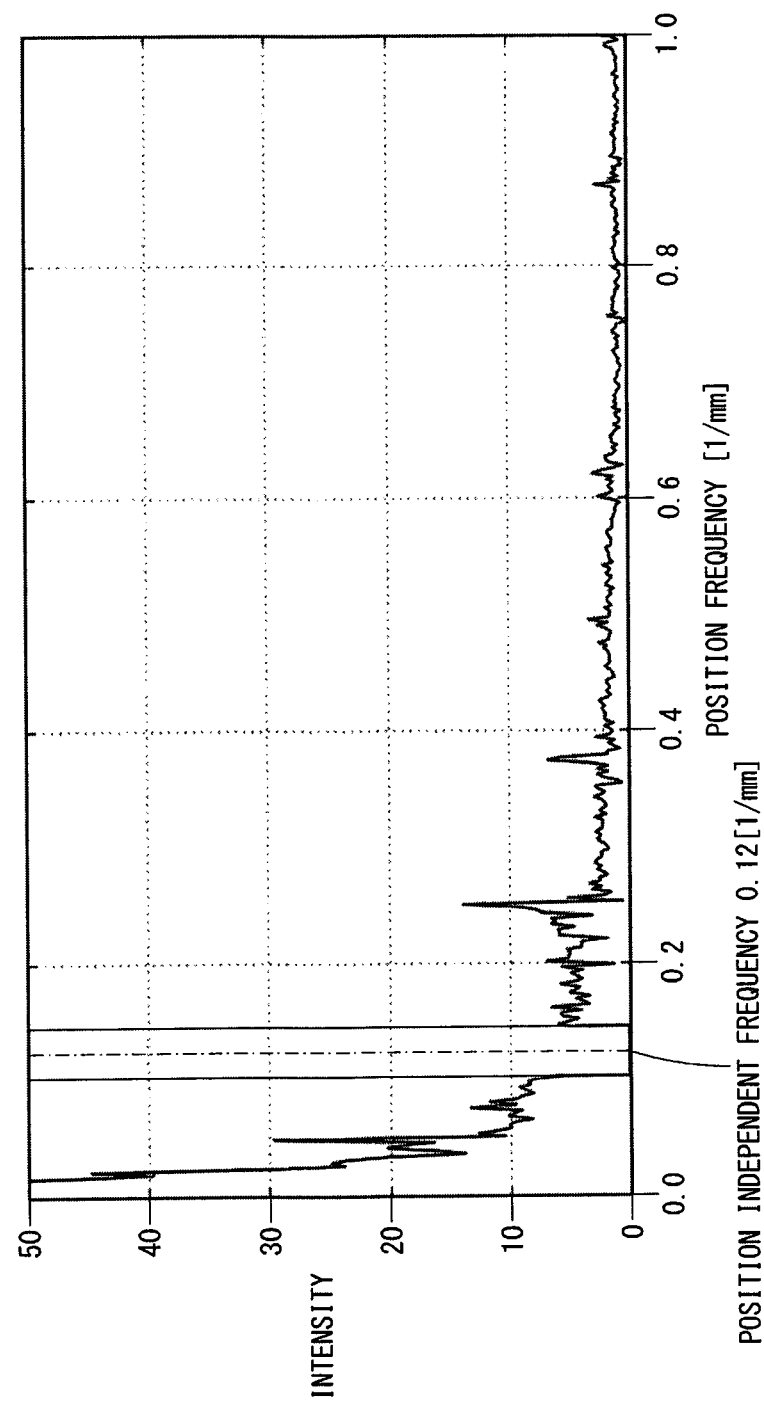
FIG. 6 is a graph showing positional frequency characteristics from which position independent frequency components are removed.

Based on the positional frequency characteristics acquired by the positional frequency characteristic acquisitor 48, the position dependent vibration acquisitor 52 removes the components of the position independent frequencies stored in the position independent frequency storage 50. FIG. 6 is a graph showing the positional frequency characteristics from which the component of the position independent frequency is removed. Based on the positional frequency characteristics, the position dependent vibration acquisitor 52 removes the frequency components (spectrum) within a predetermined frequency band around the position independent frequency. Alternatively, when there are plural position independent frequencies and the difference between the two position independent frequencies is equal to or smaller than a predetermined value (frequency), the position dependent vibration acquisitor 52 removes the frequency components (spectrum) in the frequency band between the two position independent frequencies.

Further, the position dependent vibration acquisitor 52 performs inverse Fourier transformation on the positional frequency characteristics from which the components of the position independent frequency (frequencies) have been removed to restore the vibration of the worktable 10 in the Y-axis direction in position space with respect to the X-axis direction of the worktable 10, and obtains it as position dependent vibration.

The compensation quantity acquisitor 54 calculates and obtains the Y-axis compensation quantity for the position of the worktable 10 in the Y-axis direction so as to cancel the position dependent vibration. The Y-axis compensation quantity acquired by the compensation quantity acquisitor 54 is output to the Y-axis motor drive controller 44. In the above description, the Y-axis compensation quantity has been described, but the X-axis compensation quantity can also be obtained in the movement command compensation unit 40 in the same manner. The compensation quantity acquisition device 41 is not limited to a personal computer or the like but may be a CNC.

[Operation and Effect]

The feed mechanism control device 34 for the worktable 10 of the present embodiment controls the X-axis motor 26 and the Y-axis motor 32 so as to cancel the vibrations of the worktable 10 in the X-axis direction and the Y-axis direction. The vibration of the worktable 10 in the Y-axis direction when the worktable 10 is moved in the X-axis direction includes vibration depending on the position in the X-axis direction and vibration independent of the position in the X-axis direction. The vibration independent of the position on the X axis does not occur when the worktable 10 is located at fixed positions in the X-axis direction. Therefore, if the Y-axis motor drive controller 44 controls the Y-axis motor 32 trying to cancel the vibration of the worktable 10 in the Y-axis direction acquired by the vibration acquisitor 46, it is impossible to suppress the vibration and there is a risk of amplifying the vibration.

Therefore, the feed mechanism control device 34 for the worktable 10 of the present embodiment removes the vibration of the position independent frequency component from the vibration of the worktable 10 in the Y-axis direction acquired by the vibration acquisitor 46, then controls the X-axis motor 26 and the Y-axis motor 32 so as to cancel the position dependent vibration. Thereby, the feed mechanism control device 34 for the worktable 10 of the present embodiment can suppress the vibration of the worktable 10 in the Y-axis direction when the worktable 10 is moved in the X-axis direction. Similarly, the feed mechanism control device 34 for the worktable 10 of the present embodiment can suppress the vibration of the worktable 10 in the X-axis direction when the worktable 10 is moved in the Y-axis direction.

Though in the present embodiment the feed mechanism 12 of the worktable 10 used in a wire electrical discharge machine has been described, it is possible to suppress the vibration of the worktable in a similar manner for the feed mechanism of the worktable used in other machine tools.

Further, the feed mechanism 12 of the worktable 10 of the present embodiment is used to suppress vibrations of the worktable 10 in the X-axis direction and the Y-axis direction, but can be applied to a worktable feed mechanism having a Z-axis element such as a spindle of a machine tool. In this case, it is possible to suppress the vibration of the worktable in the Z-axis direction when the worktable is moved in the X-axis direction or in the Y-axis direction. In this configuration, the X-axis motor or the Y-axis motor constitutes the first driver 27, and the Z-axis motor for moving the spindle in the Z-axis direction constitutes the second driver 33.

[Technical Ideas Obtained from Embodiment]

Technical ideas that can be grasped from the above embodiment will be described below.

The compensation quantity acquisition device (41) used when the movement target (11) is moved in a first axis direction, includes: the vibration acquisitor (46) configured to acquire vibration of the movement target (11) in a second axis direction, orthogonal to the first axis direction when the movement target (11) is moved in the first axis direction; the positional frequency characteristic acquisitor (48) configured to acquire a positional frequency characteristic by performing Fourier transformation on the vibration in the second axis direction acquired by the vibration acquisitor (46); the position independent frequency storage (50) configured to store a positional frequency of the vibration in the second axis direction that occurs independently of the position of the movement target (11) in the first axis direction, as a position independent frequency; the position dependent vibration acquisitor (52) configured to perform inverse Fourier transformation on the positional frequency characteristic from which the component of the position independent frequency has been removed, to recover the vibration of the movement target (11) in the second axial direction as position dependent vibration; and the compensation quantity acquisitor (54) configured to acquire positional compensation quantity of the movement target (11) in the second axis direction that cancels the position dependent vibration. As a result, the compensation quantity acquisition device (41) can acquire compensation quantity for suppressing the vibration in the second axis direction of the movement target (11) when the movement target (11) is moved in the first axis direction.

In the above compensation quantity acquisition device (41), the position dependent vibration acquisitor (52) is configured to perform inverse Fourier transformation on the positional frequency characteristic from which the frequency components (spectrum) within a predetermined frequency band containing the position independent frequency has been removed. Thus, the feed mechanism control device (34) of the movement target (11) can acquire position dependent vibration of the movement target (11).

In the above compensation quantity acquisition device (41), when the difference between two position independent frequencies is equal to or smaller than a predetermined value, the position dependent vibration acquisitor (52) is configured to perform inverse Fourier transformation on the positional frequency characteristic from which the frequency components (spectrum) in the frequency band between the two position independent frequencies has been removed. Thus, the feed mechanism control device (34) of the movement target (11) can acquire position dependent vibration of the movement target (11).

The feed mechanism control device (34) includes: the first driver (27) configured to move the movement target (11) in a first axis direction; the second driver (33) configured to move the movement target (11) in a second axis direction orthogonal to the first axis direction; and the second drive controller (45) configured to drive the second driver (33) based on the compensation quantity acquired by the above-described compensation quantity acquisition device (41) when the movement target (11) is being moved in the first axis direction by the first driver (27). Thereby, the feed mechanism control device (34) can suppress vibration of the movement target (11) in the second axis direction when the movement target (11) is moved in the first axis direction.

The compensation quantity acquiring method used when the movement target (11) is moved in a first axis direction includes: a vibration acquiring step of acquiring vibration of the movement target (11) in a second axis direction, orthogonal to the first axis direction when the movement target (11) is moved in the first axis direction; a positional frequency characteristic acquiring step of acquiring a positional frequency characteristic by performing Fourier transformation on the vibration in the second axis direction acquired by the vibration acquiring step; a position independent frequency storing step of storing a positional frequency of the vibration in the second axis direction that occurs independently of the position of the movement target (11) in the first axis direction, as a position independent frequency; a position dependent vibration acquiring step of performing inverse Fourier transformation on the positional frequency characteristic from which the component of the position independent frequency has been removed, to recover the vibration of the movement target (11) in the second axial direction as position dependent vibration; and a compensation quantity acquiring step of acquiring positional compensation quantity of the movement target (11) in the second axis direction that cancels the position dependent vibration.

With this compensation quantity acquiring method, it is possible to acquire compensation quantity for suppressing vibration in the second axis direction of the movement target (11) when the movement target (11) is moved in the first axis direction.

In the above compensation quantity acquiring method, the position dependent vibration acquiring step may perform inverse Fourier transformation on the positional frequency characteristic from which the frequency components (spectrum) within a predetermined frequency band containing the position independent frequency has been removed. With this compensation quantity acquiring method, the feed mechanism control device (34) of the movement target (11) can acquire position dependent vibration of the movement target (11).

In the above compensation quantity acquiring method, when the difference between two position independent frequencies is equal to or smaller than a predetermined value, the position dependent vibration acquiring step performs inverse Fourier transformation on the positional frequency characteristic from which the frequency components (spectrum) in the frequency band between the two position independent frequencies has been removed. With this compensation quantity acquiring method, the feed mechanism control device (34) of the movement target (11) can acquire position dependent vibration of the movement target (11).

A control method for a feed mechanism comprising the first driver (27) for moving a movement target (11) in a first axis direction and the second driver (33) for moving the movement target (11) in a second axis direction orthogonal to the first axis direction, includes a second drive controlling step of driving the second driver (33) based on the compensation quantity acquired by the above-described compensation quantity acquiring method when the movement target (11) is being moved in the first axis direction by the first driver (27). With this compensation quantity acquiring method, it is possible to acquire compensation quantity for suppressing vibration in the second axis direction of the movement target (11) when the movement target (11) is moved in the first axis direction.

The present invention is not limited to the embodiments described above, and it goes without saying that the embodiments can be freely modified within a range that does not deviate from the essence and gist of the present invention as set forth in the appended claims.

What is claimed is:

1. A compensation quantity acquisition device used when a movement target is moved in a first axis direction, comprising:
    a vibration acquisitor configured to acquire vibration of the movement target in a second axis direction, orthogonal to the first axis direction when the movement target is moved in the first axis direction;
    a positional frequency characteristic acquisitor configured to acquire a positional frequency characteristic by performing Fourier transformation on the vibration in the second axis direction acquired by the vibration acquisitor;
    a position independent frequency storage configured to store a positional frequency of the vibration in the second axis direction that occurs independently of a position of the movement target in the first axis direction, as a position independent frequency;
    a position dependent vibration acquisitor configured to perform inverse Fourier transformation on the positional frequency characteristic from which a component of the position independent frequency has been removed, to recover the vibration of the movement target in the second axial direction as position dependent vibration; and
    a compensation quantity acquisitor configured to acquire positional compensation quantity of the movement target in the second axis direction that cancels the position dependent vibration.

2. The compensation quantity acquisition device according to claim 1, wherein the position dependent vibration acquisitor is configured to perform inverse Fourier transformation on the positional frequency characteristic from which frequency components within a predetermined frequency band containing the position independent frequency has been removed.

3. The compensation quantity acquisition device according to claim 1, wherein, when a difference between two position independent frequencies is equal to or smaller than a predetermined value, the position dependent vibration acquisitor is configured to perform inverse Fourier transformation on the positional frequency characteristic from which frequency components in a frequency band between the two position independent frequencies has been removed.

4. A feed mechanism control device comprising:
    a first driver configured to move a movement target in a first axis direction;
    a second driver configured to move the movement target in a second axis direction orthogonal to the first axis direction; and
    a second drive controller configured to drive the second driver based on the compensation quantity acquired by the compensation quantity acquisition device according to claim 1 when the movement target is being moved in the first axis direction by the first driver.

5. A compensation quantity acquiring method used when a movement target is moved in a first axis direction, comprising:
    a vibration acquiring step of acquiring vibration of the movement target in a second axis direction, orthogonal to the first axis direction when the movement target is moved in the first axis direction;
    a positional frequency characteristic acquiring step of acquiring a positional frequency characteristic by performing Fourier transformation on the vibration in the second axis direction acquired by the vibration acquiring step;
    a position independent frequency storing step of storing a positional frequency of the vibration in the second axis direction that occurs independently of a position of the movement target in the first axis direction, as a position independent frequency;
    a position dependent vibration acquiring step of performing inverse Fourier transformation on the positional frequency characteristic from which a component of the position independent frequency has been removed, to recover the vibration of the movement target in the second axial direction as position dependent vibration; and
    a compensation quantity acquiring step of acquiring positional compensation quantity of the movement target in the second axis direction that cancels the position dependent vibration.

6. The compensation quantity acquiring method according to claim 5, wherein the position dependent vibration acquiring step performs inverse Fourier transformation on the positional frequency characteristic from which frequency components within a predetermined frequency band containing the position independent frequency has been removed.

7. The compensation quantity acquiring method according to claim 5, wherein, when a difference between two position independent frequencies is equal to or smaller than a predetermined value, the position dependent vibration acquiring step performs inverse Fourier transformation on the positional frequency characteristic from which frequency components in a frequency band between the two position independent frequencies has been removed.

8. A control method for a feed mechanism comprising a first driver for moving a movement target in a first axis direction and a second driver for moving the movement target in a second axis direction orthogonal to the first axis direction, the method comprising a second drive controlling step of driving the second driver based on the compensation quantity acquired by the compensation quantity acquiring method according to claim 5 when the movement target is being moved in the first axis direction by the first driver.

* * * * *